(12) United States Patent
Anzengruber et al.

(10) Patent No.: US 9,040,872 B2
(45) Date of Patent: May 26, 2015

(54) CONNECTION SYSTEM COMPRISING A COUPLING DEVICE AND A PLUG ELEMENT FOR A WELDING TORCH

(75) Inventors: Thomas Anzengruber, Linz (AT); Wolfgang Brunmayr, Wels (AT); Christoph Fuereder, Gunskirchen (AT); Thomas Hiesmayr, Sierning (AT); Rainer Kronlachner, Meggenhofen (AT); Anton Lauber, Weisskirchen (AT); Karl-Heinz Pfluegl, Ohlsdorf (AT); Maximilian Rola, Wartberg an der Krems (AT)

(73) Assignee: Fronius International GmbH, Pettenbach (AT)

( * ) Notice: Subject to any disclaimer, the term of this patent is extended or adjusted under 35 U.S.C. 154(b) by 761 days.

(21) Appl. No.: 13/318,813

(22) PCT Filed: May 6, 2010

(86) PCT No.: PCT/AT2010/000156
§ 371 (c)(1),
(2), (4) Date: Feb. 2, 2012

(87) PCT Pub. No.: WO2010/127377
PCT Pub. Date: Nov. 11, 2010

(65) Prior Publication Data
US 2012/0125905 A1    May 24, 2012

(30) Foreign Application Priority Data
May 6, 2009    (AT) .................................. A 690/2009

(51) Int. Cl.
*B23K 9/32*    (2006.01)
*B23K 9/133*    (2006.01)

(52) U.S. Cl.
CPC . *B23K 9/323* (2013.01); *B23K 9/32* (2013.01); *B23K 9/133* (2013.01)

(58) Field of Classification Search
CPC .......... B23K 9/32–9/327; B23K 9/133–9/1336
USPC ................................................. 219/137.63
See application file for complete search history.

(56) References Cited

U.S. PATENT DOCUMENTS

| 3,610,875 A | 10/1971 | Dal Molin |
| 4,270,824 A | 6/1981 | Erickson |

(Continued)

FOREIGN PATENT DOCUMENTS

| CH | 670 210 | 5/1989 |
| CH | 681 213 | 2/1993 |

(Continued)

OTHER PUBLICATIONS

International Search Report of PCT/AT2010/000156 dated Oct. 1, 2010.

*Primary Examiner* — Sang Y Paik
(74) *Attorney, Agent, or Firm* — Collard & Roe, P.C.

(57) ABSTRACT

The invention relates to a connection device (27) comprising a coupling device (24) and a plug element (34) for a welding torch (10) connected to the coupling device (24) by at least one hose assembly (23), said coupling device arranged at least partially in the housing, wherein a welding wire (13), delivered by a feed unit (29) which is arranged on a motor plate (28), and additional media are conducted to the welding torch (10) via the hose assembly (23) and wherein the hose assembly (23) is connected to the plug element (34). In order to create such a connection system (27), the coupling device is formed by a connection device (30) comprising an end wall (38) and a separating wall (39) of the motor plate (28), wherein the end wall (38) is designed to receive the coupling (35), the connection device (30) is constructed to at least guide and position a pin (37), and the connection device (30) is independent of the housing.

19 Claims, 8 Drawing Sheets

(56) References Cited

U.S. PATENT DOCUMENTS

| | | | | |
|---|---|---|---|---|
| 4,549,068 A | * | 10/1985 | Kensrue | 219/137.63 |
| 4,582,979 A | | 4/1986 | Moerke | |
| 4,864,099 A | * | 9/1989 | Cusick et al. | 219/137.62 |
| 5,718,831 A | * | 2/1998 | Zigliotto | 219/121.48 |
| 6,078,023 A | | 6/2000 | Jones et al. | |
| 6,427,894 B1 | * | 8/2002 | Blank et al. | 226/177 |
| 6,713,711 B2 | * | 3/2004 | Conway et al. | 219/121.48 |
| 6,786,752 B1 | * | 9/2004 | Kerekes et al. | 439/339 |
| 7,285,746 B2 | * | 10/2007 | Matiash | 219/137.2 |
| 2002/0162826 A1 | | 11/2002 | Eickhoff et al. | |
| 2003/0038119 A1 | * | 2/2003 | Eickhoff et al. | 219/121.39 |
| 2003/0100208 A1 | | 5/2003 | Conway et al. | |
| 2006/0226134 A1 | | 10/2006 | Giese et al. | |
| 2007/0284352 A1 | | 12/2007 | Lynaugh et al. | |
| 2010/0108656 A1 | | 5/2010 | Natta | |

FOREIGN PATENT DOCUMENTS

| | | |
|---|---|---|
| CN | 85101985 A | 1/1987 |
| CN | 1 370 099 A | 9/2002 |
| DE | 93 19 418 | 4/1994 |
| EP | 0 222 716 | 5/1987 |
| GB | 1 354 395 | 6/1974 |
| JP | S55-108684 U | 7/1980 |
| JP | S58-38538 Y2 | 8/1983 |
| JP | S63-180180 U | 11/1988 |
| JP | 2003-503207 A | 1/2003 |
| WO | WO 2003/041459 | 5/2003 |
| WO | WO 2007/031806 | 3/2007 |
| WO | WO 2007/146963 | 12/2007 |

\* cited by examiner

CONNECTION SYSTEM COMPRISING A COUPLING DEVICE AND A PLUG ELEMENT FOR A WELDING TORCH

CROSS REFERENCE TO RELATED APPLICATIONS

This application is the National Stage of PCT/AT2010/000156 filed on May 6, 2010 which claims priority under 35 U.S.C. §119 of Austrian Application No. A 690/2009 filed on May 6, 2009, the disclosure of which is incorporated by reference. The international application under PCT article 21(2) was not published in English.

The invention relates to a connection system comprising a coupling device and a plug element for a welding torch connected to the coupling device by at least one hose assembly, said coupling device arranged at least partially in a housing, wherein a welding wire, delivered by a feed unit which is arranged on a motor plate, and additional media are conducted to the welding torch via the hose assembly and wherein the hose assembly is connected to the plug element.

The invention also relates to a coupling of a connecting system for a welding torch, which connected to the connecting system by at least one hose assembly, wherein a welding wire, delivered by a feed unit which is arranged on a motor plate and additional media are conducted to the welding torch via the hose assembly.

The invention also relates to an electrical coupling of a connecting system for a welding torch connected to the connecting system by means of at least one hose assembly, wherein a welding wire, delivered by a feed unit which is arranged on a motor plate and additional media are conducted to the welding torch via the hose assembly.

Furthermore, the invention relates to a plug element of a connecting system for a welding torch connected to the connecting system by at least one hose assembly, wherein a welding wire, delivered by a feed unit which is arranged on a motor plate and additional media are conducted to the welding torch via the hose assembly.

Finally, the invention also relates to a motor plate with a feed unit for guiding a welding wire to a welding torch via a hose assembly, and said welding torch is connected to a connection system.

As known from CH 670 210 A5, the hose assembly of the welding torch is equipped with a plug connected to a coupling or a so-called general connection at the welding torch. By means of such a connection system, the welding current, the welding wire, a gas and the control lines, and other media are conducted to the welding torch via the hose assembly. For this purpose, appropriate connections are provided. Similar couplings are known from WO 2007/146963 A2, CH 681 213 A5 or DE 93 19 418 U1.

It is disadvantageous in this cases that the plug is connected to the coupling by means of screw connection, which requires more space for the plug. Similarly, the weight of the hose assembly has to be borne by said screw connection. It is furthermore of disadvantage that the power transmission is effected via the coupling, because the coupling has thus to be formed of electrically conductive material. Additionally, the power transmission is effected by means of screws, springs or spring pre-load, so that an optimal power transmission cannot be assured. It is therefore necessary to insulate the coupling to avoid a power transmission to the housing, for example to the housing of a welding device. This enlarges the constructive effort and the required space with respect to such a coupling.

In this case it is also disadvantageous that the coupling is secured to the housing, so that also the coupling causes a higher place requirement. This is mainly traced back to the fact that the coupling has to accommodate the pin of the plug completely to assure a power transmission. Additionally, the space requirement is enlarged because a guiding of the welding wire between the motor plate and the coupling is required.

Thus, a disadvantage of such connection systems is that the flexibility is restricted due to the enlarged space requirements. Also intermediate drives of longer hose assemblies will require more space. Additionally, the enlarged space requirement causes a weight increase, which is of importance with respect to automated systems because for instance the free moving space and the ease of running of the robot will be restricted. Furthermore, the laying of hose assembly with respect to automated systems will be complicated because of the enlarged space requirements, if the hose assembly will be passed at least partially inside the robot arm.

It is also a disadvantage that an inlet nozzle for the welding wire is not integrated in the connection system. That means that the inlet nozzle is, for example, a part of the guiding situated between the motor plate and the coupling. Thus, a laborious exchange of the inlet nozzle is required because essentially the guiding has to be dismounted. An exchange is required in case another diameter of welding wire is used.

The objective of the invention is to create a flexible and compact connection system for a welding torch.

The objective of the invention is achieved in that the coupling device is formed by a connection device comprising an end wall and a separating wall of a the motor plate, wherein the end wall provides an accommodation for the coupling, and that the connection device is formed at least to guide and position a pin, and that the connection system in independent from the housing.

The advantage of this approach is that the hose assembly essentially is directly connected to the connection device of the motor plate, so that the welding wire is directly conducted from the feed unit into the hose assembly. In this case the pin is positioned and centered in the connection device in such a way that a changeover with low friction of the welding wire is realized. It is also an advantage that the connection system is applicable extremely flexibly because, essentially, the hose assembly is directly connected to the connection device and therefore the connection device is independent from the housing. That means that the coupling device is not mounted to the housing. Thus, also the weight of the coupling device is borne by the motor plate. It is furthermore of advantage that all media (current, welding wire, gas) that are essential for gas shielded arc welding can be transmitted to the hose assembly directly from the motor plate or the connection device, respectively. Thus, the motor plate itself and without any additional measures represents a coupling device. This results in the other advantage, that an extremely space saving plug element can be used. Thus, the hose assembly and the plug element can be passed together inside a so-called hollow-shaft robot.

Due to the measure that both the end wall and the separating wall are each embodied with one recess for guiding the pin in the connection device, wherein the separating plate is formed for positioning an inlet nozzle of the pin for the welding wire and is arranged separated from the end wall, it is advantageously achieved that the pin is held and centered by the motor plate (end wall and separating wall), and the pin carries the weight of the hose assembly. Thus, the positioning or the fitting is separated from and the power transmission and the transmission of the other media. Similarly, the plug element is fixed via the pin.

According to the features in an embodiment it is advantageous that the connection system, due to two couplings and the one plug connection, is formed in a space saving way regarding all media. Thus, all media can be transmitted within small space. Due to the one plug connection, similarly, a quick exchange is possible and at least the features required for establishing contact are available via the connections of the plug connections. Similarly, due to an own electrical coupling a defined electrical contact is provided. It is also advantageous that the coupling forms an insulation between the current-carrying motor plate and the housing. It is furthermore of advantage that one proper line per media is possible in spite of the confined space available. Finally, also the automatic gas connection to the coupling or directly to the plug element is advantageous, since said gas connection is connected to the end wall.

Similarly, the objective of the invention is achieved in that the coupling is embodied to transmit a part of the media, and the coupling is formed to be secured to a connection device and the coupling is equipped with a connection for transmitting the other media within the connection device.

It is an advantage in this case that the additional media in the coupling can be flexibly arranged according to the respective requirements and that the arrangement on the end wall of the motor plate results in the required stability of the coupling.

Further advantages concerning the features of the subclaims may be taken from the advantages already described.

The objective of the invention is also achieved in that the electrical coupling is equipped with a feed through and an interlocking system for a pin, and the feed through is formed as a connection for transmitting the welding current to the pin.

In this case it is advantageous that the guidance of the pin and the clamping for the transmission of the current take place with constant power and a compensation of production tolerances as well as a quick exchange of the torch (for example in case of shift working) can be realized. It is also advantageous that the lever serves as a check for correct interlocking, basically by turning it over its dead center. Additionally, the overbearing of the dead center can be defined by the locking of the lever into a groove of the pin.

Further advantages concerning the features of the subclaims may be taken from the advantages already described.

Furthermore, the objective of the invention is achieved in that the plug element is equipped with at least one pin, which has an inlet nozzle for a welding wire arranged at its loose ending, and at least the pin is embodied to be connected to a connection device formed by an end region of the motor plate.

The resultant advantages may be taken from the advantages already described.

Finally, the objective of the invention is also achieved in that at least one end region of the motor plate is formed by a connection device for a welding torch or a hose assembly, with the connection device being embodied by an end wall and a separating wall.

The resultant advantages may also be taken from the advantages already described.

The present invention is explained in more detail with reference to the enclosed schematic drawings, and the disclosures contained throughout the entire description can be applied to the same parts with the same reference numbers. Furthermore, also individual features from the embodiment or the various exemplary embodiments shown can represent in themselves independent inventive solutions.

First of all it should be noted that the same parts of the exemplary embodiment have been given the same reference numerals.

FIG. 1 shows a welding device 1 or a welding system for various different processes or methods, such as e.g. MIG/MAG welding or WIG/TIG welding or electrode welding methods, double-wire/tandem-welding methods, plasma welding or soldering etc.

Figure 1:
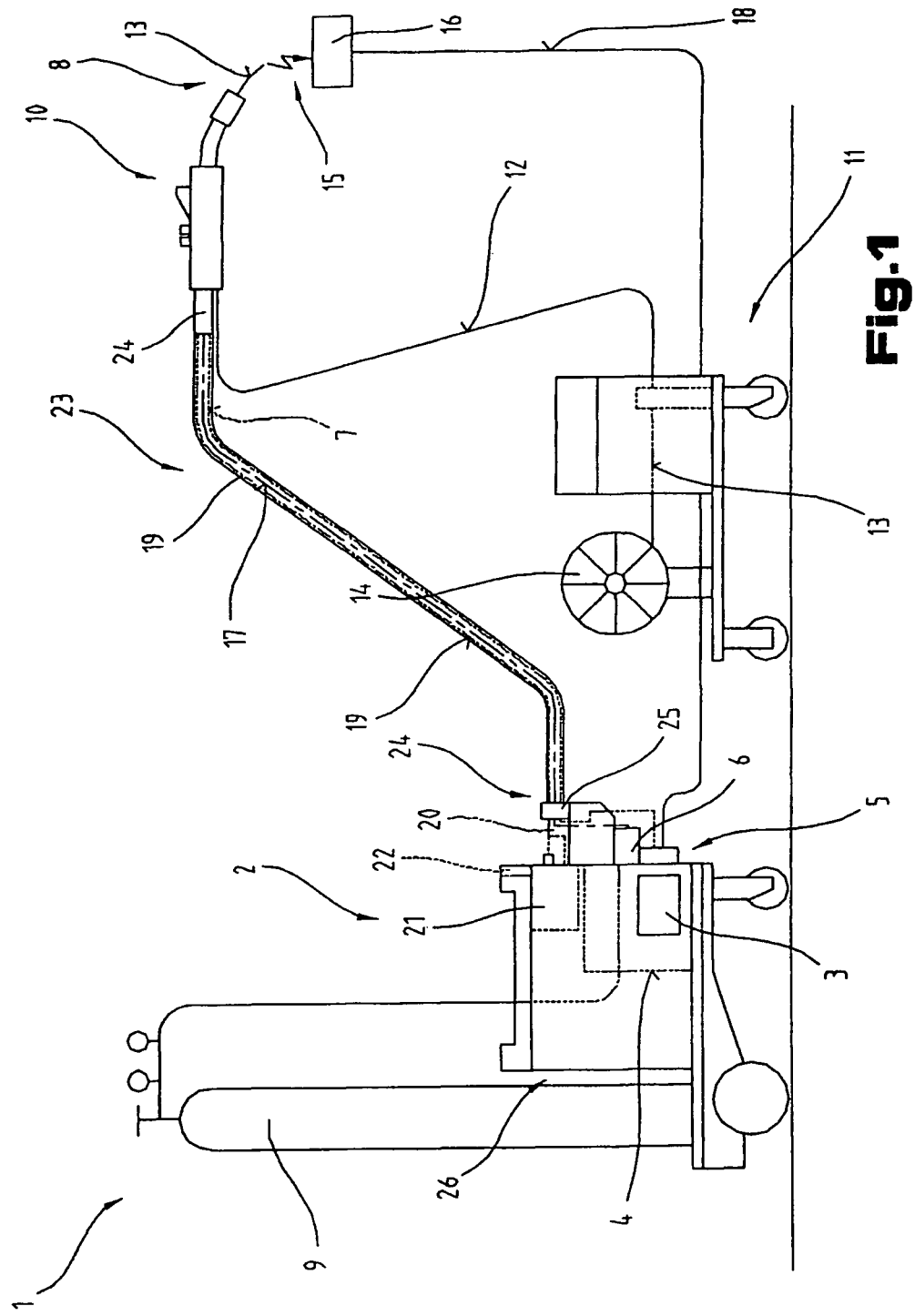
FIG. 1 shows a schematic view of a welding machine or a welding device.

The welding device 1 comprises a current source 2 with a power element 3, a control device 4 and a switching member 5 assigned to the power element 3 or the control device 4. The switching member 5 or the control device 4 is connected to a control valve 6, which is arranged in a supply line 7 for a gas 8, in particular a protective gas, such as for example $CO_2$, helium or argon and the like between a gas tank 9 and a welding torch 10 or torch.

Furthermore, a wire feed device 11 such as commonly used for MIG/MAG welding, can be controlled by means of the control device 4, and by means of a supply line 12 an additional material or a welding wire 13 can be supplied from a delivery spool 14 or a wire roll into the region of the welding torch 10. Of course it is possible for the wire feed device 11, as known from prior art, to be integrated into the welding device 1, in particular into the basic housing, and not to be designed as an additional device, as shown in FIG. 1.

It is also possible that the wire feed device 11 feeds the welding wire 13 or the additional material outside the welding torch 10 to the processing point, wherein for this in the welding torch 10 preferably a non-fusing electrode is arranged, as it is usually the case in WIG/TIG-welding.

The current for creating an arc 15, in particular a working arc, between the non-fusing electrode (not shown) and the workpiece 16 is supplied via a welding line 17 from the power element 3 of the current source 2 to the welding torch 10, in particular the electrode, wherein the workpiece 16 to be welded, which is made up of several parts, is also connected via an additional welding line 18 to the welding device 1, in particular to the current source 2, and thus a circuit can be created via the arc 15 or the plasma beam formed for a process.

For cooling the welding torch 10 via a cooling circuit 19 the welding torch 10 can be connected with the interconnection of a flow indicator 20 to a liquid container, in particular a water container 21, and when operating the welding torch 10 the cooling circuit 19, in particular a liquid pump used for the liquid arranged in the water container 21, is started and thus the welding torch 10 can be cooled effectively.

The welding device 1 also comprises an input and/or output device 22, by means of which the different welding parameters, operating modes or welding programs of the welding device 1 can be adjusted or requested. In this way the welding parameters, modes of operation or welding programs set via the input and/or output device 22 are forwarded to the control device 4 and the latter then controls the individual components of the welding system or the welding device 1 or determines corresponding reference values for the regulation or control.

Furthermore, in the shown exemplary embodiment the welding torch 10 is connected via a hose assembly 23 to the welding device 1 or the welding system. In the hose assembly 23 the individual lines from the welding device 1 to the welding torch 10 are arranged. The hose assembly 23 is connected via a coupling device 24 to the welding torch 10, whereas the individual lines in the hose assembly 23 are connected to the individual contacts or connections of the welding device 1 via connection sockets or plug connections. To ensure a strain relief of the hose assembly 23, the hose package 23 is connected via a strain relief device 25 to a housing 26, in particular the basic housing of the welding device 1. Of course it is also possible for the coupling device 24 to be used for the connection to the welding device 1 instead of the connection sockets or plug connections. In this way a connection system 27 for the welding torch 10 is formed by means of the coupling device 24. FIG. 1 shows the welding device 1 or the welding system in an embodiment with two coupling devices 24, one of which connects the hose package 23 to the welding torch 10 and another of which connects the hose package 23 to the basic housing 26 of the welding device 1.

In principle, it should be mentioned that for the different welding methods or welding devices 1, such as for example WIG devices or MIG/MAG-devices or plasma devices, not all of the previously named components have to be used or employed. It is possible for example for the welding torch 10 to be designed as an air-cooled welding torch 10.

As already mentioned, the welding torch 10 for a MIG/MAG-welding process is supplied with different media (like gas and welding current) and in particular a welding wire 13 is fed to the welding torch 10. Said welding wire 13 is either situated in the wire feed device 11 or in the welding device 1 on the delivery spool 14, so that the welding wire 13 can be delivered by a feed unit 29 arranged on a motor plate 28. This means that the welding wire 13 is delivered from the delivery spool 14, via the motor plate 28, the connection system 27 and the hose assembly 23 to the welding torch 10.

According to the invention it is intended that the connection system 27 for the welding torch 10 comprises a connection device 30, which is formed by an end wall 38 and a separating wall 39 of the motor plate 28. Similarly, the connections for the connection system 27 are divided in several layers (31, 32, 33).

In the following, the connection system 27 according to the invention is described on the basis of an exemplary embodiment. In this case the connection system 27 is formed by a coupling device 24, whereby said coupling device 24 comprises the connection device 30, a coupling 35 and an electrical coupling 36. The plug element 34 is in this case attached to the one end of the hose assembly 23, wherein the welding torch 10 is attached to the other end. Accordingly, the plug element 34 (in the following also referred to as plug 34) is connected to the coupling, the connection device 30 and the electrical coupling 36 when being connected to the connection system 27.

The connection system 27 is shown in the general view of FIG. 2 to 11. Basically, the connection system 27 has the task to provide the welding torch 10 with the media, such as the welding current, gas 8, welding signals 40, welding wire 13, and the like, required for a welding process, as generally known from prior art. Accordingly, one line in the hose assembly 23 is provided for each of the media. Similarly, in the coupling device as well as in the plug 34 one connection is provided for each of the respective media.

In order to transmit in a space-saving way a large number of said media via a plug 34, the connections of the coupling device 24 for the plug 34 are, according to the invention, divided in several layers 31, 32, 33. Therefore, the coupling 35 and the electrical coupling 36 are accordingly required, being aligned consecutively. That means, that the transition of the different media is effected at different places or layers 31, 32, 33 as it can particularly be seen in FIG. 2 to 4.

In this case the welding wire 13 is essentially delivered to the plug 34 by the feed unit 29 directly arranged on the motor plate 28. It can also be said that the welding wire 13 delivered by the feed unit 29 is received by the plug 34, so that the welding wire 13 can be conducted to the welding torch 10 via the hose assembly 23. According to the invention this is already ensured if the pin 37 of the plug 34 is positioned in the connection device 30. In case the connection system 27 is used for a hand torch it is essentially required to transmit also the other media.

Therefore, according to the invention the coupling 35 and the electrical coupling 36 are provided, which are arranged at the connection device 30 of the motor plate 28, so that the other media can be transmitted to the plug 34 directly after the welding wire 13, seen towards the direction of the welding torch 10. For this purpose, the connection device 30 has an end wall 38 and a separating wall 39, and the electrical coupling 36 is arranged between end wall 38 and separating wall 39 and the coupling 35 is secured to the end wall 38. Thus the electrical coupling 36 is mounted on the motor plate 28 and the coupling 35 is mounted to the motor plate 28.

Thereby the coupling 35 is preferably made of an electrically nonconductive material like plastics and embodied for transmitting the following media: eleven control signals 40, the gas 8, one air 42 and one data bus 43. Accordingly, the coupling 35 has fourteen connections, which are essentially arranged in a circle, as it can particularly be seen in FIGS. 6 and 7. In this case the connections for the control signals 40 alternately feature different heights, so that the air and creep distances required can be observed in spite of confined space available. Additionally, the coupling 35 features a feed through 44 in the area around the middle of the circle, so that the further media can be transmitted behind the coupling 35 to the plug 34—in direction of the feed unit 29. This mainly concerns the welding current and the welding wire 13. Thus the feed through 44 forms a connection to the connection device 30, where the welding current and the welding wire 13 are transmitted. The welding current is in this case transmitted from the electrical coupling 36 via the pin 37 to the plug 34, thus directly behind the coupling 35. Therefore, looking towards the feed unit 29, the welding wire 13 is received by the plug 34 in the very rear part, essentially in the separating wall 39 of the connection device 30.

It can thus be said that the fourteen connections of the coupling 35 are supplemented by a connection of the electrical coupling 36 and a connection for receiving the welding wire 13. Nevertheless, this also means that three layers 31, 32, 33 are formed for connections wherein the first layer 31 is formed by the coupling 35, the second layer 32 by the electrical coupling 36 and the third layer 33 is formed by the connection for accommodating the welding wire 13.

The connection for receiving the welding wire 13 in this case results on the one hand from the arrangements of coupling 35, end wall 38, electrical coupling 36, separating wall 39 and the feed unit 29, and on the other hand from the plug 34.

Figure 2:
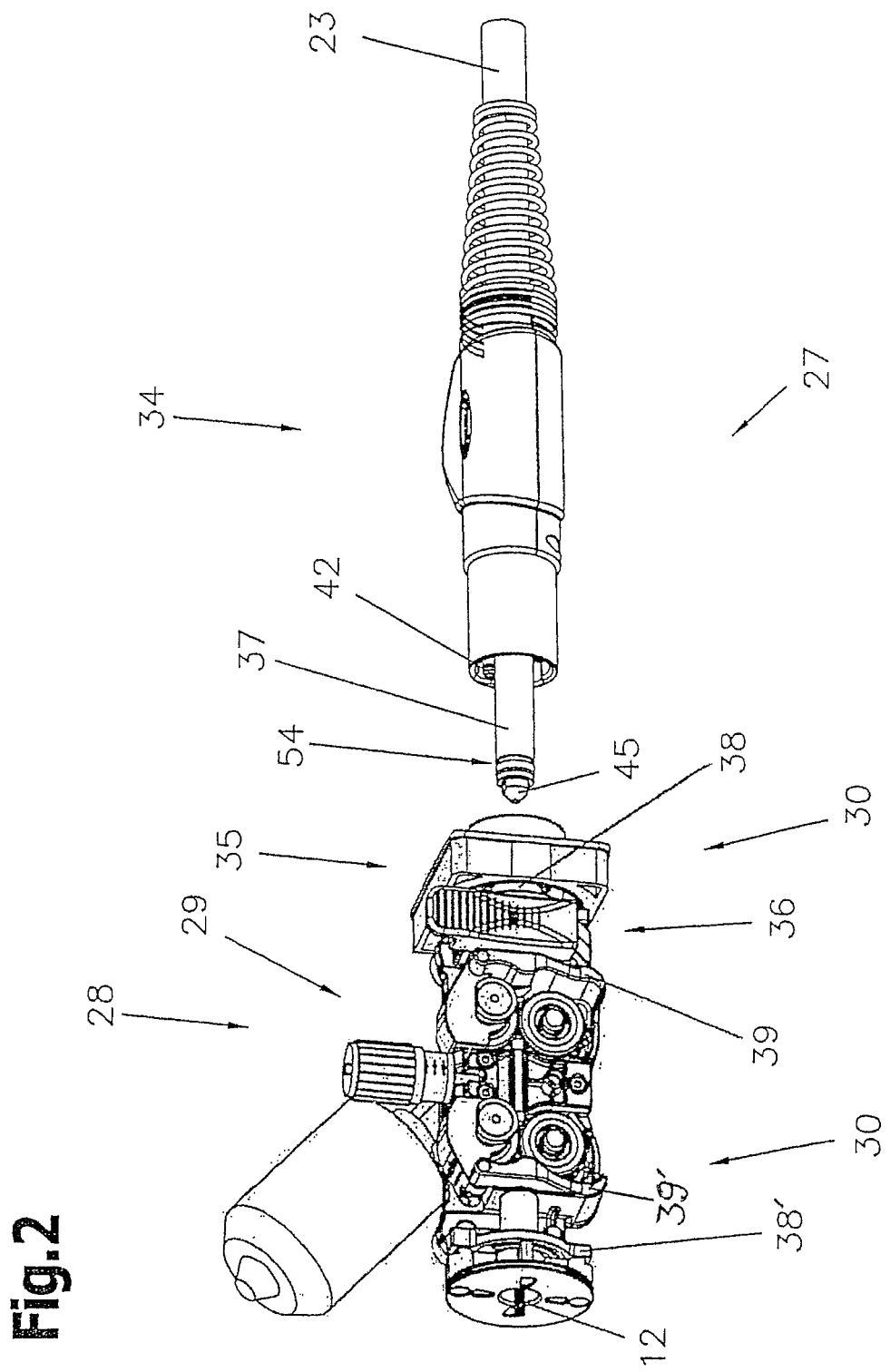
FIG. 2 shows a schematic, three-dimensional view of the connection system according to the invention in a not connected state.
Figure 3:
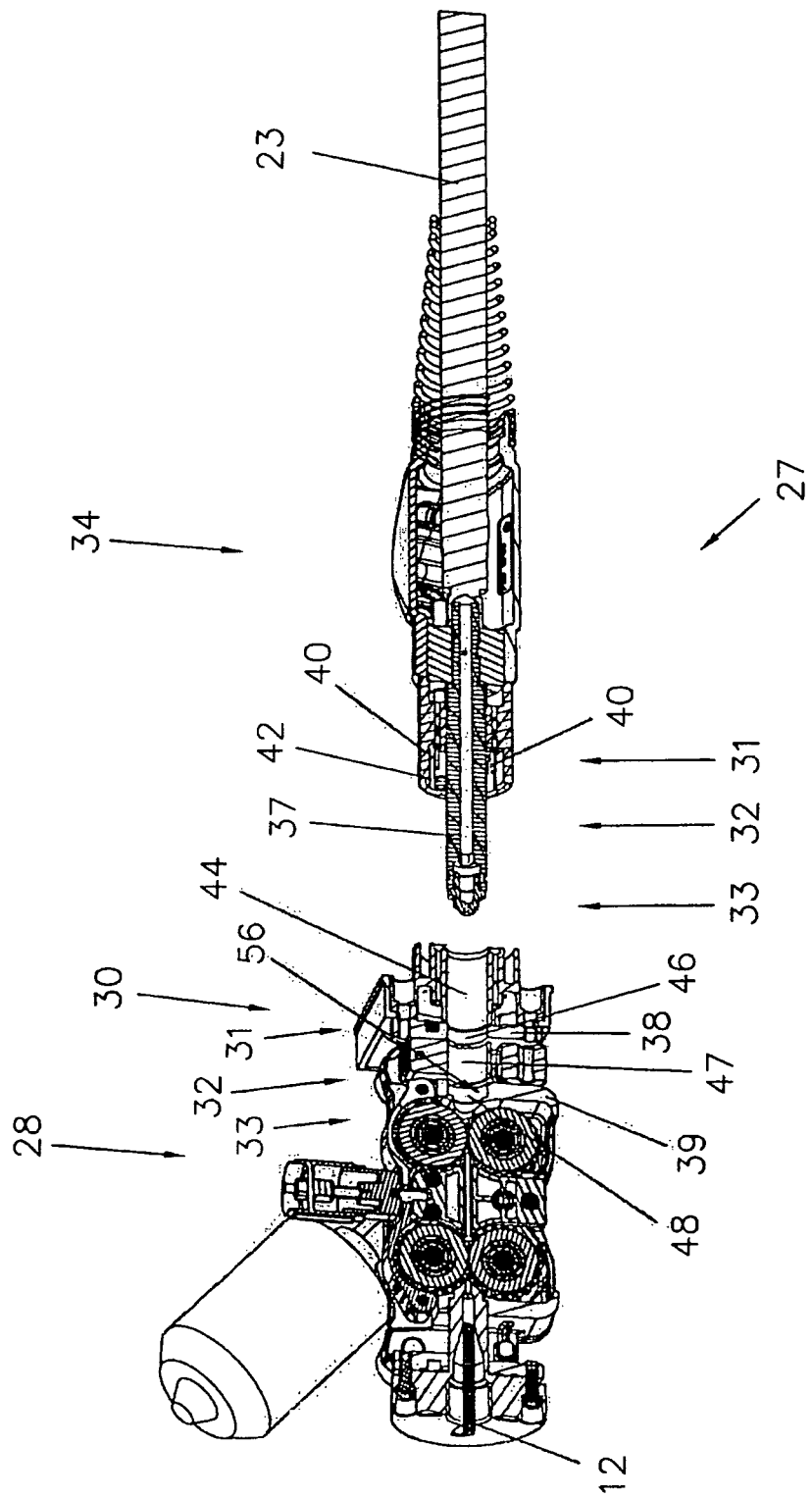
FIG. 3 shows a schematic, three-dimensional cross section of the connection system according to the invention in a not connected state.
Figure 4:
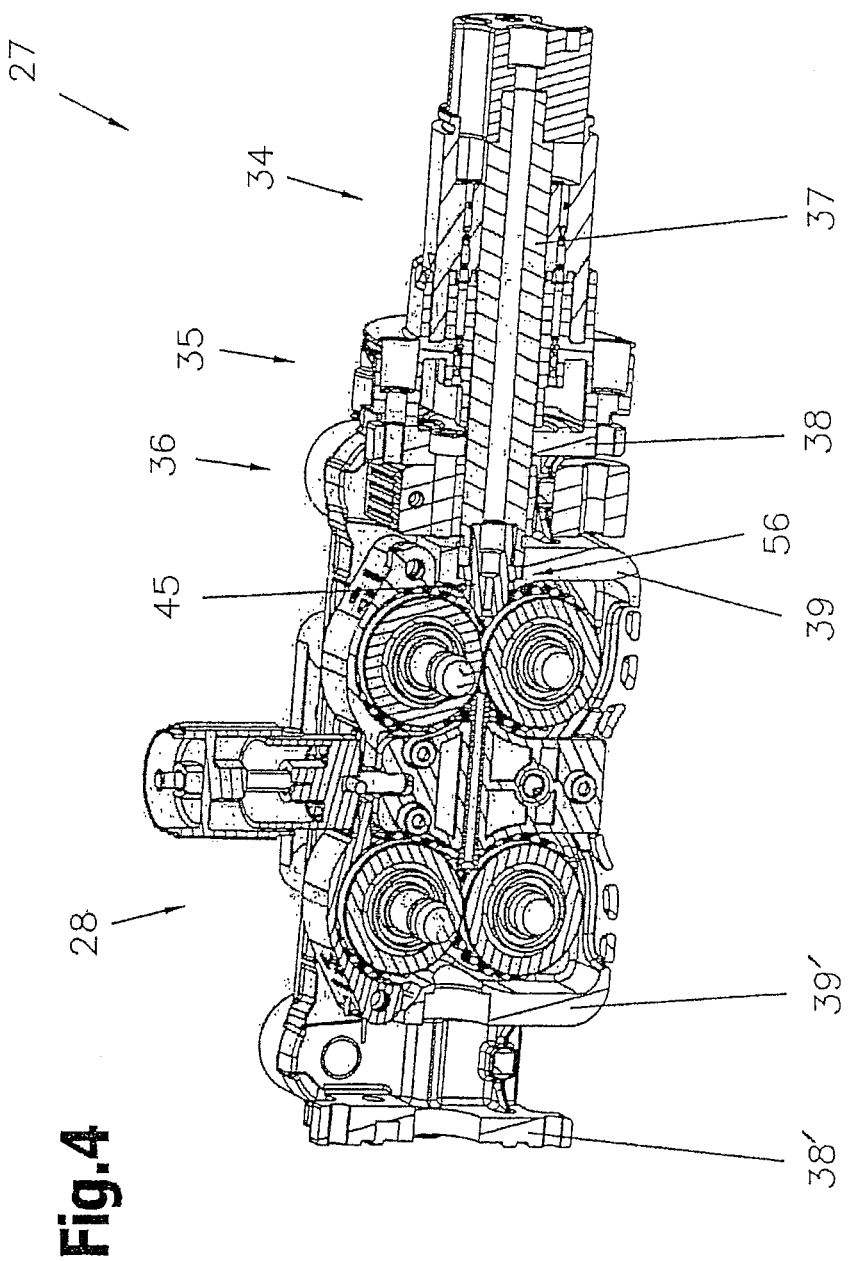
FIG. 4 shows a schematic, three-dimensional cross section of the connection system according to the invention in a connected state.
Figure 11:
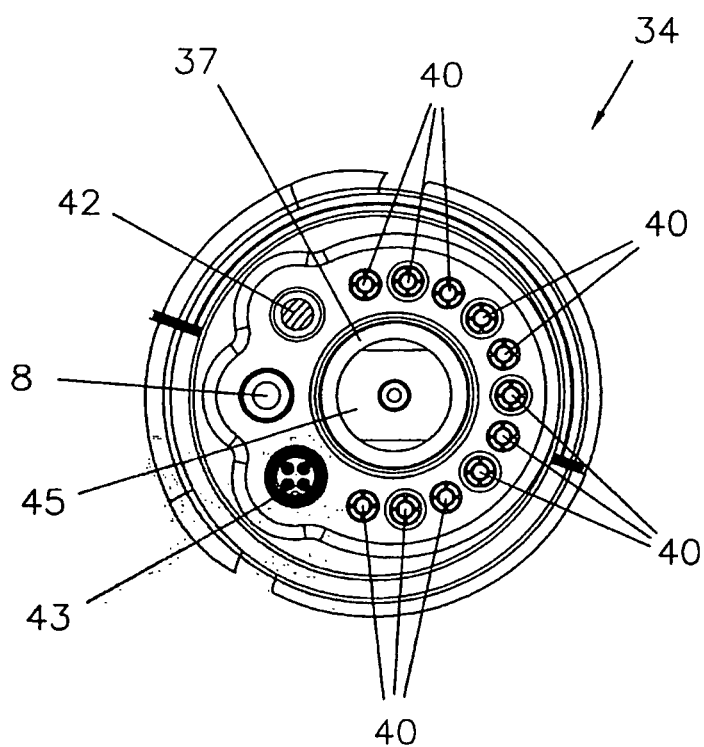
FIG. 11 shows a schematic top view of the of the plug element of the connection system.

The plug 34, thus should be embodied in such a way that the media can be transmitted via the connections divided between three layers 31, 32, 33 of the coupling device to the connections corresponding to these connections of the plug 34, see particularly FIGS. 2, 3 and 11. For this reason, the plug 34 is embodied correspondingly to the coupling 35, wherein instead of the feed through 44 of the coupling 35, a pin 37 is arranged at the plug 34. Said pin 37 essentially represents the corresponding connection for the welding current at the plug 34 and forms together with the inlet nozzle 45 arranged at the loose ending of the plug 34 the connection for receiving the welding wire 13.

That means that, when connecting the connection system 27, in a first step the pin 37 of the plug 34 is conducted through the feed through 44 of the coupling 35, in the following through the recess of the end wall 38 and consequently through the feed through 47 of the electrical coupling 36. In this state, the plug 34 is centered and held by the pin 37 conducted in the coupling 35, end wall 38 and electrical coupling 36, so that in a second step the plug 34 can easily be brought into the correct position according to an anti-twist-protection. The anti-twist-protection is preferably designed by the connections of air 42, gas 8 and/or the data bus 43, because these connections are larger compared to those of the control signals 40. Thus the connections of the coupling 35 can be connected to the corresponding connections of the plug 34 in the first layer 31 and simultaneously the pin 37 can be positioned and centered in a recess 48 of the end wall 39 in a third step. Accordingly, there is a kind of stopper 56 arranged in the recess 48 of the separating wall 39, so that only a part of the inlet nozzle 45 protrudes from the recess 48. In this way, also the distance between the outlet of the welding wire 13 from two feed rolls of the feed unit 29 and the inlet nozzle 45 is reduced to a minimum or the feed rolls can be arranged directly in front of the inlet nozzle 45 accordingly, so that an accurate conducting of the welding wire 13 is ensured. Thus, the recess 48 has two different diameters, wherein in the larger diameter the pin 37 and in the smaller diameter the inlet nozzle 45—being mounted floatingly in the pin 37, so to speak—are centered. Thus also the length of the pin 37 and the stopper 56 define when the connections of the media are connected correctly. In this state thus, also the connection for receiving the welding wire 13 is designed completely. That means that due to the inlet nozzle 45 being centered in the recess 48 of the separating wall 39, the retainer for the welding wire 13 is aligned with the delivering axis of the welding wire 13, so that the welding wire 13 essentially can be collected automatically. Thus, in this state, all connections are connected, except from the entire transmission of the welding current, which can particularly be seen in FIG. 4. From this can accordingly be seen that the feed throughs 44, 47 of the coupling 35 and the electrical coupling 36 are aligned with the recesses 46, 48 of the end wall 38 and the separating wall 39. Thus, also the center axis of the pin 37 and the delivering axis of the welding wire 13.

In general, the pin 37 has a diameter which can essentially be used to transmit a large range of welding current. Thus the pin 37 can be used for nearly all applications. Additionally, the diameter of the pin 37 has also to be designed for bearing the weight of the plug element 34. This is essentially achieved by a diameter in a range of about 17 mm. The diameter is for example 17.31 mm.

Figure 8:
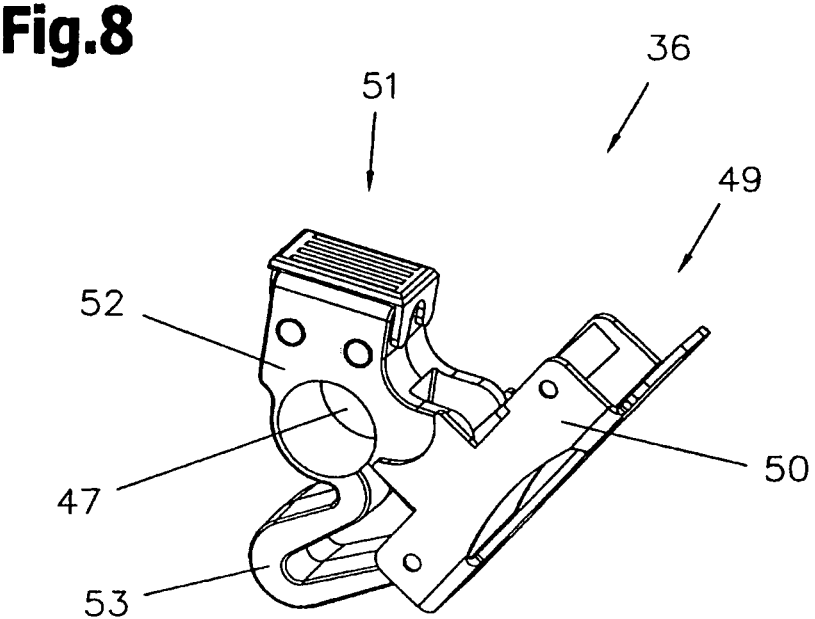
FIG. 8 shows a schematic, three-dimensional view of the electrical coupling of the connection system.
Figure 9:
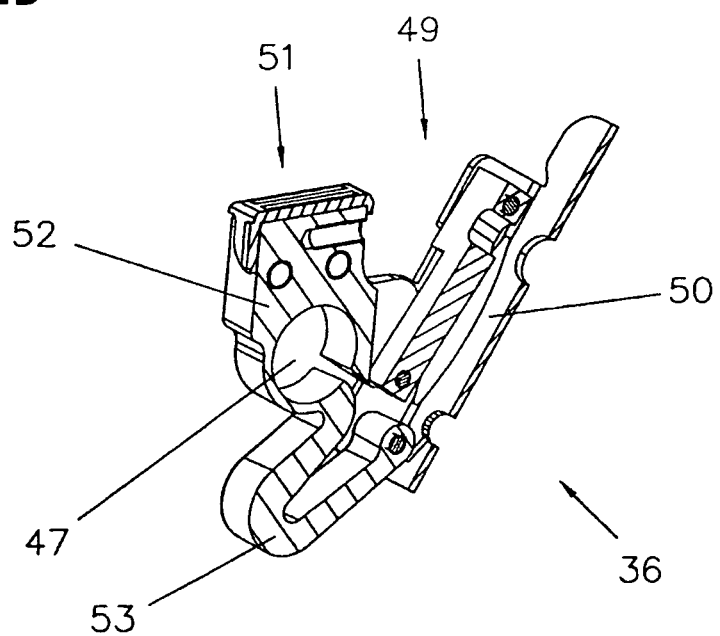
FIG. 9 shows a schematic, three-dimensional cross section of the electrical coupling of the connection system.
Figure 10:
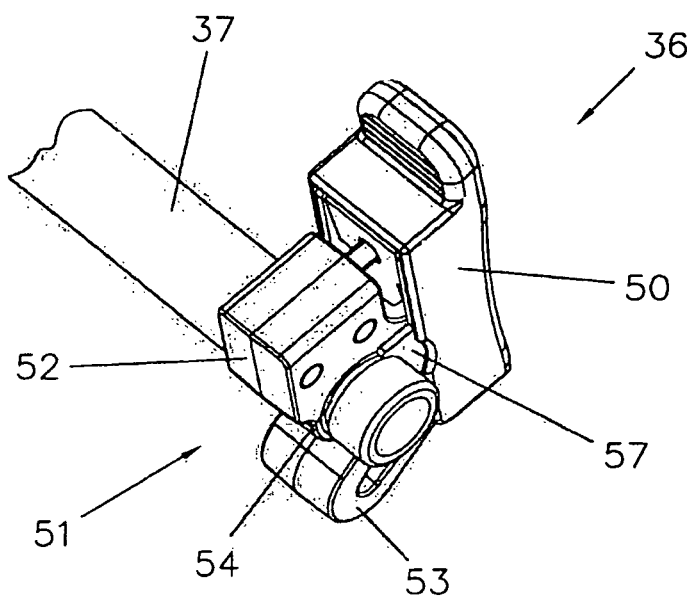
FIG. 10 shows a schematic, three-dimensional view of the to a bolt of the of the plug element connected electrical coupling of the connection system.

The transmission of the welding wire is effected in such a way that the electrical coupling 36—as particularly shown in FIG. 8 to 10—is designed with an interlocking system 49, which has to be open when connecting the connection system 27. When being closed, the interlocking system 49 causes that the pin 37 essentially is completely surrounded and clamped with a defined force, as it can particularly be seen in FIG. 10. For this purpose, the interlocking system 49 features a lever 50, which is preferably connected to a piece of brass 51 of the electrical coupling 36, wherein at least the piece of brass 51 is electrically conductive. The preferably one-piece piece of brass 51 is so to speak divided into an inflexible part 52 and a flexible part 53. The feed through 47 for the pin 37 is thus arranged within the inflexible part 52. Furthermore, the lever 50 connects the flexible part 53 to the inflexible part 52 on one side, so that when the lever 50 is operated the diameter of the feed through 47 is reduced and the pin 37 is clamped due to an eccentric force. The flexible part 53 additionally serves as a clip, which causes that differences in tolerances of the pin 37 can be compensated and the dead center of the interlocking system 49 can be overborne. Thus the closed lever 50 can essentially be considered as a self-locking lever 50. Due to the closed lever 50 results an area, which clamps the pin 37 and via which the welding current is transmitted to the pin 37. Accordingly, the area is adjusted to the level of the welding current. To ensure that the welding current can be transmitted to the pin 37, the electrical coupling 36 is secured to the inner end wall 38, and the supply line for the welding current is generally connected to the motor plate 28. Thus the welding current is transmitted from the supply line via the motor plate 28 to the electrical coupling 36, so that finally the welding current can be transmitted to the pin 37. Of course it is also possible to connect the supply line for the welding current directly to for example the electrical coupling. By such a mounting of the electrical coupling 36 is also achieved that the feed through 47 can be aligned when being mounted. Additionally, the lever 50 can be designed in such a way that a part of the lever 50—a counter piece 57—locks in a groove 54 of the bolt when being closed and so additionally secures the lever, as it can be seen in detail in FIG. 10.

The electrical coupling 36 is thus secured to the inner end wall 38, and the mounting is preferably realized by screws. The latter are connected from the outside—through the end wall 38—to the thread in the inflexible part 52 of the electrical coupling 36. Thus there is no thread provided in the end wall 38 which results in an accurate alignment of the feed through 47.

After the electrical coupling 36 was mounted, the coupling 35 can be mounted to the exterior of the end wall 38—the so-called flange. In this case, the screws 36—the undesignated circles on the end wall 38 in FIG. 5—for mounting the electrical coupling are hidden. On the one hand it is essential that the mounting of the coupling 35 is essentially effected on a level with the center axis of the recess 46 by providing for example a securing element 41 or thread 41 on the left and on the right of or above and below (depending from the installation position of the motor plate 28) the recess 46. It is thus ensured that the weight of the plug 34 is held by the mounting and the strain of the coupling 35—for example when removing the plug 34—is minimized.

Similarly, the feed through 44 of the coupling 35 is designed to be the guidance for the pin 37 of the plug 34, with the feed through 44 being electrically insulating. Said guidance essentially has a length of some centimeters and forms together with the size of the end wall 38 the distance between the first layer 31 and the second layer 32. Beside the guidance, said distance has the second effect that the connection lines for the connections of the coupling 35 (like control signals 40, data bus 43 and air 42) can be conducted. Nevertheless, it is also possible that the feed through 44 is designed to be electrically conductive. Thus, for example, an additional power transmission can be realized in the feed through 44. To achieve this, a clip can be used if applicable, which surrounds the pin 37 and transmits the current to the latter.

Figure 5:
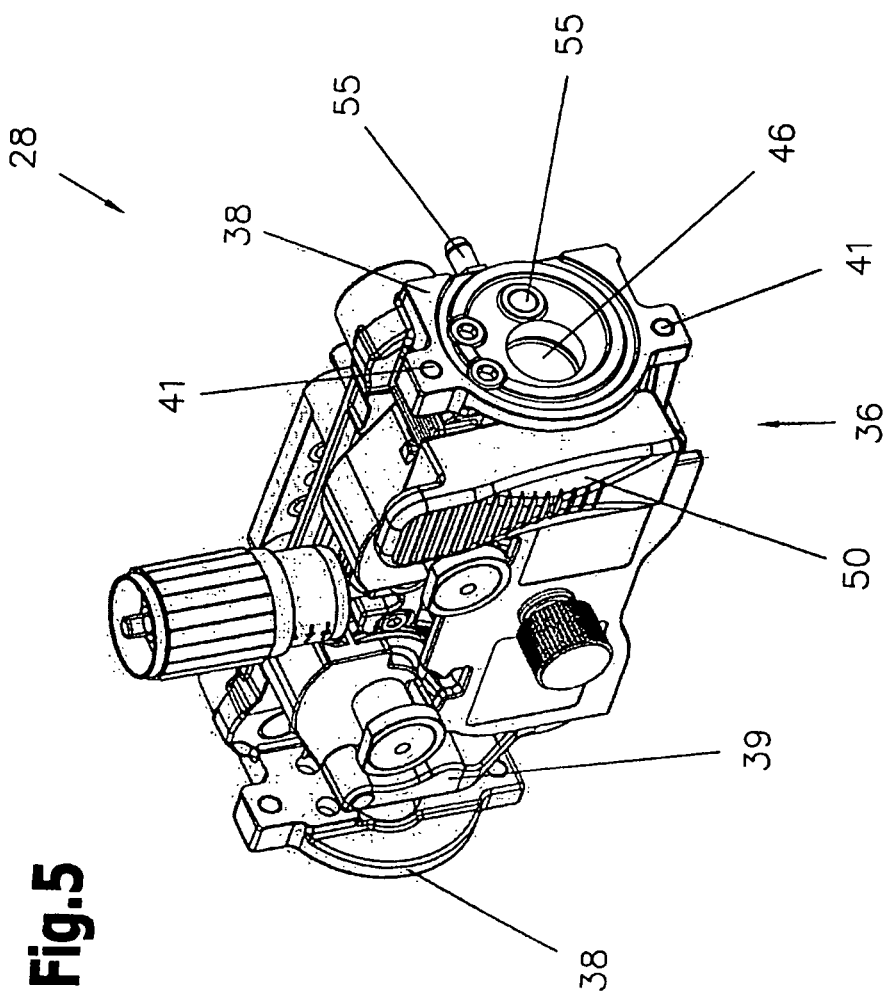
FIG. 5 shows a schematic, three-dimensional view of the motor plate of the connection system.
Figure 6:
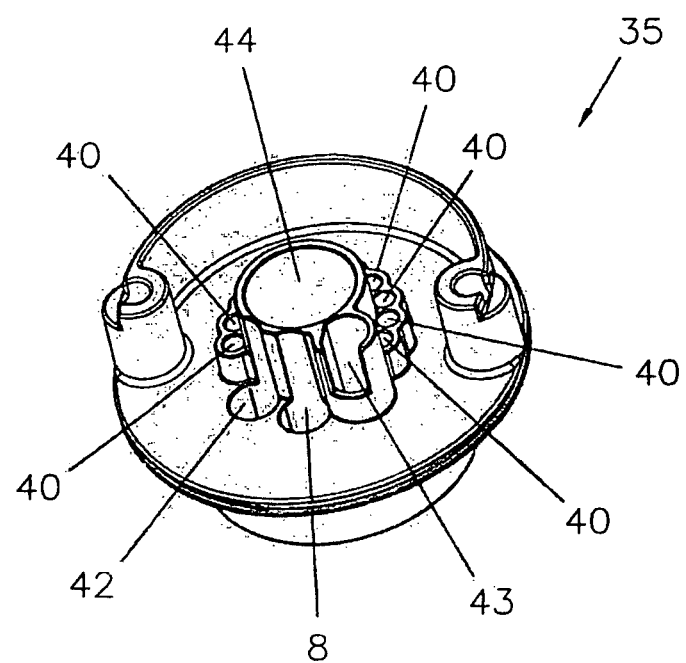
FIG. 6 shows a schematic, three-dimensional rear view of the coupling of the connection system.
Figure 7:
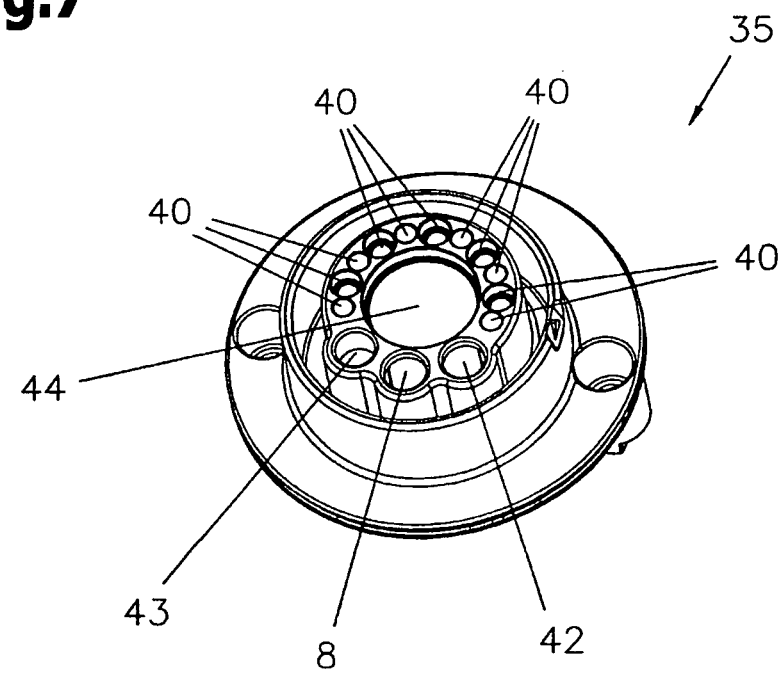
FIG. 7 shows a schematic, three-dimensional front view of the coupling of the connection system.

Additionally, the end wall 38 can be provided with a gas supply connection 55, which is preferably aligned with the connection for gas 8 of the coupling 35. Thus, when securing the coupling 35, the gas connection 8 of the coupling 35 is automatically connected to the gas supply connection 55 on the end wall 38. Said gas supply connection 55 essentially runs to the lower side of the base plate of the motor plate 28, where the gas inlet pipe and the feed cable for the welding current are connected. In this case, thus, four points are of importance for the coupling 35: the recess 46, the end wall 38, the two threads 41 and the gas supply connection 55. The respective distance between these points has particularly to be kept in mind to ensure that the media can be transmitted to the welding torch 10 via the connection device 30. Said distances are particularly adapted to a feed through for media of a robot—as for example a so-called hollow-shaft robot. The diameter of such a feed through for media is in a range of about 42 mm. Accordingly, the outer diameter of the plug 34 thus has to be at least a minimum smaller. As already said, this is achieved by the division of the connections between the different layers 31, 32, 33. Due to said feed through of the media in the range of about 42 mm, the following distances for connecting the coupling 35 result:

The distance between the center of the thread 41 and the center of the recess 46 of the end wall 38 is essentially 28 mm. In this case, the threads 41 are essentially arranged on a vertical line through the center of the recess 46 of the end wall 38. The distance between the center of the recess of the end wall 38 and the center of the gas supply connection 55 is essentially 14 mm. In this case, the center of the gas supply connection 55 is arranged on a horizontal line through the center of the recess 46 of the end wall 38. This arrangement of thread 41, recess 46 and gas supply connection 55 can essentially be seen in FIG. 5, showing the usual installation position of the motor plate 28. Because in this case, the motor plate 28 is shown upright, so to speak, the previously described vertical and horizontal line result. In case, the motor plate 28 is installed lying, the horizontal or the vertical line, respectively, have to be exchanged.

Essentially due to its round plug 34, the connecting system 27 according to the invention is applicable for a hollow-shaft robot, and all media compulsory required and additional media can be transmitted to the welding torch via one single plug 34. An additional media can be for example air 42, which can be used for so-called blowing out. Another media can be transmitted via a control wire.

To achieve an essentially lossless transmission of the media it is important that the connection system 27 is connected completely. This is essentially controlled by checking whether the lever 50 of the interlocking system 49 can be closed. That means that when the lever 50 allows to be closed, the connection system 27 is completely closed and ready for operation. In case the lever 50 does not allow to be closed completely, the plug 34 is not positioned correctly. This check results from the groove 54 in the pin 37 and the respective counter piece of the lever 50, which is fitted into the groove 54 (FIG. 10). Thus, the pin 37 is, on the one hand, clamped in the feed through 47 of the electrical coupling 36 and, on the other hand, retained by the groove 54 so that essentially a double protection against a changing of the position of the plug 34 is provided. Accordingly, the clamping and the retaining by the groove 54 are made together with the lever 50.

This also ensures that the inlet nozzle 45 or the pin 37 are positioned and centered correctly in the separating wall 39. Thus, the welding wire 13 can be received with low friction. In this case, the stopper 56 in the separating wall 39 has the task to represent the noticeable end position of the plug 34 and to protect the other connections against being overstressed.

A complete connection of the connection system 27 is also important for the data bus 43, because the latter is embodied to be a so-called high-speed-data bus 43. For this purpose, an appropriate shielding within the plug connection is required, because the pin 37 carrying a welding current of for example 500 A is arranged in direct proximity. In this case, the changeover from a high-speed-date cable of the data bus 43 to the plug connection is realized within the distance between the first layer 31 and the second layer 32.

The connection system 27 or the lever 50 can thus only be closed completely when the plug 34 is inserted into the separating wall 39 of the connection device 30 up to the stopper 56 or the inlet nozzle 45 ends in the feed through 47 of the electrical coupling 36. In case of the latter, only the welding current is being transmitted and the welder can see that the plug 34 has to be inserted more.

Of course, a completely connected connection system may be recognized from the fact that a control signal 40 is only produced when the plug 34 is inserted up to the stopper 56. Accordingly, it is possible to close for example a contact within the coupling 35 or to operate a switch within the coupling 35 so that no control signal 40 is required.

Generally, the motor plate 28 is also embodied in such a way that the connection device 30 is arranged on both sides, consequently in front of and after the feed unit 29, so that a symmetric design of the motor plate 28 is given. For that embodiment, the second end wall 38' and the second separating wall 39' shown to the left in FIGS. 2 and 4 would be configured in a manner corresponding to the end wall 38 and the separating wall 39 shown to the right in FIGS. 2 and 4. Thus, the motor plate 28 may also be applied to a so-called intermediate drive which essentially interrupts the hose assembly 23. The connection system 27, nevertheless, is everywhere the same and thus homogeneous.

Due to the connection device 30 of the motor plate 28, the connection system 27 is extremely flexibly applicable. Thus, for example a so-called machine-type torch for robots can be connected directly to the connection device 30 without requiring a coupling 35. This traces back to the fact that such a mechanical torch/torch cutter only requires a limited number of media, frequently only the welding current, the gas 8 and the welding wire 13. According to the invention, these media may be transmitted to the plug 34 via the connection device 30 and the electrical coupling 36. For this purpose, for example either a shortened pin 37, allowing that the gas connection 8 of the plug 34 may be connected directly to the gas supply connection 55, or an intermediate piece between the gas connection 8 of the plug 34 and the gas supply connection 55, can be applied. If applicable, the electrical coupling 36 may be omitted, so that the media are exclusively transmitted via the connection device 30. For this purpose, clips transmitting the welding current to the pin 37 are integrated into for example the recesses 46 of the end wall 38 and the separating wall 39. Said clips can accordingly also be inserted into any embodiment of the connection system 27, as for example into the feed through 47 of the electrical coupling 36.

The connection system 27 may also be embodied in such a way that the plug element 34 or the coupling 35 is formed as an adapter. In this case, the hose assembly 23 is accordingly connected to the adapter. The form of the adapter essentially corresponds either to the form of the plug element 34 or the plug 34 or a combination of plug 34 and coupling 35. In any case, the adapter requires the pin 37, which is accordingly positioned in the connection device 30. If the adapter for example is formed by a combination of plug 34 and coupling 35, the pin 37 essentially is connected to the coupling 35, which is accordingly also mounted to the end wall 38. In this case, the pin 37 represents the connection between the coupling 35 and the connection device 30. If the adapter corresponds to the plug 34, essentially the adapter instead of the plug 34 is connected to the coupling 35, the connection device 30 and the electrical coupling 36.

Thus the hose assembly may be mounted to the adapter accordingly. The further media may be accordingly transmitted by means of an own interface and/or the adapter. In this case, this interface is mostly arranged next to the adapter. Thus, also hose assemblies 23, which are not provided with the plug 34 according to the invention, could be connected to the connection device 30.

Generally, it can be said, that the plug element 34 is connected to the hose assembly 23. This connection between the plug element 34 and the hose assembly 23 represents a changeover, which can be embodied in different ways:

On the one hand, the plug element 34 can be mounted to the end of the hose assembly 23, as described in the exemplary embodiment.

On the other hand, the plug element 34 may be an adapter, which is made of the coupling 35 and the pin 37. In this case, it is required that a connecting device instead of the plug element 34 is mounted to the end of the hose assembly 23, connecting the hose assembly 23 to coupling 35. Thus the hose assembly 23 is connected to the plug element 34 or the adapter via the connection element.

This also applies if the adapter corresponds to the plug element 34.

Finally, as a point of formality, it should be noted that for a better understanding of the structure of the devices according to the invention the latter and their components have not been represented true to scale in part and/or have been enlarged and/or reduced in size.

The problem addressed by the independent solutions according to the invention can be taken from the description.

Mainly the individual embodiments shown in FIG. 1 to 11 can form the subject matter of independent solutions according to the invention. The objectives and solutions according to the invention relating hereto can be taken from detailed descriptions of these figures.

| List of Reference Numerals | |
|---|---|
| 1 | Welding device |
| 2 | Current source |
| 3 | Power element |
| 4 | Control device |
| 5 | Switching member |
| 6 | Control valve |
| 7 | Supply line |
| 8 | Gas |
| 9 | Gas tank |
| 10 | Welding torch |

-continued

| List of Reference Numerals | |
|---|---|
| 11 | Wire feed device |
| 12 | Supply line |
| 13 | Welding wire |
| 14 | Delivery spool |
| 15 | Arc |
| 16 | Workpiece |
| 17 | Welding line |
| 18 | Welding line |
| 19 | Cooling circuit |
| 20 | Flow indicator |
| 21 | Water container |
| 22 | Input and/or output device |
| 23 | Hose assembly |
| 24 | Coupling device |
| 25 | Strain relief device |
| 26 | Housing |
| 27 | Connection system |
| 28 | Motor plate |
| 29 | Feed unit |
| 30 | Connection device |
| 31 | First layer |
| 32 | Second layer |
| 33 | Third layer |
| 34 | Plug element |
| 35 | Coupling |
| 36 | Electrical coupling |
| 37 | Pin |
| 38 | End wall |
| 39 | Separating wall |
| 40 | Control signals |
| 41 | Thread |
| 42 | Air |
| 43 | Data bus |
| 44 | Feed through |
| 45 | Inlet nozzle |
| 46 | Recess |
| 47 | Feed through |
| 48 | Recess |
| 49 | Interlocking system |
| 50 | Lever |
| 51 | Piece of brass |
| 52 | Piece of brass inflexible |
| 53 | Piece of brass flexible |
| 54 | Groove |
| 55 | Gas supply connection |
| 56 | Stopper |
| 57 | Counter piece |

The invention claimed is:

1. Connection system comprising a coupling device and a plug element for a welding torch connected to at least one hose assembly, said coupling device arranged at least partially in a housing, wherein a first medium comprising a welding wire, delivered by a feed unit which is arranged on a motor plate, and additional media are conducted to the welding torch via the hose assembly and wherein the hose assembly is connected to the plug element, wherein the coupling device is formed by a connection device comprising an end wall and a separation wall of the motor plate, wherein the end wall is designed to receive a coupling, wherein the connection device is constructed to at least guide and position a pin, wherein the connection device is independent of the housing, and wherein an electrical coupling of the coupling device is arranged between the end wall and the separating wall, wherein the electrical coupling is equipped with a feed through and an interlocking system for a pin, wherein the feed through is designed to be a connection for transmitting the welding current to the pin and wherein the interlocking system has a lever, and wherein the lever changes the diameter of the feed through by exerting eccentric power and secures the pin.

2. Connection system according to claim 1, wherein the end wall and the separating wall are designed comprising one recess each to guide the pin within the connection device, and wherein the separating wall is embodied to position an inlet nozzle of the pin for the welding wire and arranged separated from the end wall.

3. Connection system according to claim 1, wherein the coupling is secured to the seating of the end wall and the coupling is connected to a gas supply connection integrated into the end wall.

4. Connection system according to claim 1, wherein a feed through of the coupling and the electrical coupling is aligned with the recess of the end wall and the separating wall, and wherein a stopper for the pin is designed within the recess of the separating wall.

5. Connection system according to claim 1, wherein the pin is secured by an interlocking system of the electrical coupling.

6. Connection system according to claim 1, wherein the coupling is equipped with a connection for transmitting the additional media in the connection device.

7. Connection system according to claim 6, wherein the position for securing the coupling is predetermined by the connection and a gas connection.

8. Connection system according to claim 6, wherein the connection is designed to be a feed through for a pin with an inlet nozzle for the welding wire and the gas connection is automatically connected to a gas supply connection of the end wall when the coupling is secured to an end wall of the connection device.

9. Connection system according to claim 6, wherein also the connections for an air, a data bus and eleven control signals are integrated in the coupling and arranged around the feed through and the connections are connected to connection lines leading away from the end wall.

10. Electrical coupling of a connection system for a welding torch connected to the connection system by at least one hose assembly, wherein a first medium comprising a welding wire, delivered by a feed unit which is arranged on a motor plate, and additional media are conducted to the welding torch via the hose assembly, wherein the electrical coupling is equipped with a feed through and an interlocking system for a pin, wherein the feed through is designed to be a connection for transmitting the welding current to the pin, wherein the interlocking system has a lever, and wherein the lever changes the diameter of the feed through by exerting eccentric power and secures the pin.

11. Electrical coupling according to claim 10, wherein the electrical coupling is made up of a piece of metal, which is connected to the interlocking system and in which the connection, formed by the feed through, for the welding current is integrated.

12. Electrical coupling according to claim 10, wherein the feed through of the connection for the welding current is aligned with a recess in the end wall and the separating wall of the motor plate.

13. Plug element of a connection system for a welding torch connected to the connection system by at least one hose assembly, wherein a first medium comprising a welding wire, delivered by a feed unit which is arranged on a motor plate, and additional media are conducted to the welding torch via the hose assembly, wherein the plug element is equipped with
 a connection for transmitting the additional media at a first layer, and
 at least one pin with a region for transmitting a welding current at a second adjacent layer and an inlet nozzle for the welding wire arranged at its loose ending at a third layer adjacent to the second layer, wherein at least the pin is designed for fastening to a connection device formed by the end region of the motor plate, and wherein a groove for the interlocking system of the electrical coupling is integrated into the pin.

14. Plug element according to claim 13, wherein an outer diameter of a housing of the plug element is adapted to a feed through for the media of a welding robot.

15. Plug element according to claim 13, wherein the plug element is designed to be an adapter.

16. Motor plate comprising a feed unit for delivering a welding wire to a welding torch connected to a connection system via a hose assembly, wherein at least one end region of the motor plate is formed by a connection device for a welding torch or a hose assembly, wherein the connection device is formed by an end wall and a separating wall, wherein an electrical coupling of the coupling device is arranged between the end wall and the separating wall, wherein the electrical coupling is equipped with a feed through and an interlocking system for a pin, wherein the feed through is designed to be a connection for transmitting the welding current to the pin and wherein the interlocking system has a lever, and wherein the lever changes the diameter of the feed through by exerting eccentric power and secures the pin.

17. Motor plate according to claim 16, wherein the end wall and the separating wall are each provided with a recess for a pin, with each of the said recesses being aligned with a feed through of a coupling and an electrical coupling, and wherein the coupling and the electrical coupling are secured to the connection device.

18. Motor plate according to claim 16, wherein two securing elements for securing the coupling on a vertical line through the center of the recess of the end wall are arranged, and wherein a distance between a center of the securing elements and the center of the recess is essentially defined with 28 mm.

19. Motor plate according to claim 16, wherein a distance between a center of the recess and a center of a gas supply connection has a defined length of essentially 14 mm, and wherein the center of the gas supply connection is arranged on a horizontal line through the center of the recess.

* * * * *